June 18, 1968        W. V. FIORE        3,389,277
DAMPED ELECTRICAL APPARATUS
Filed May 22, 1967
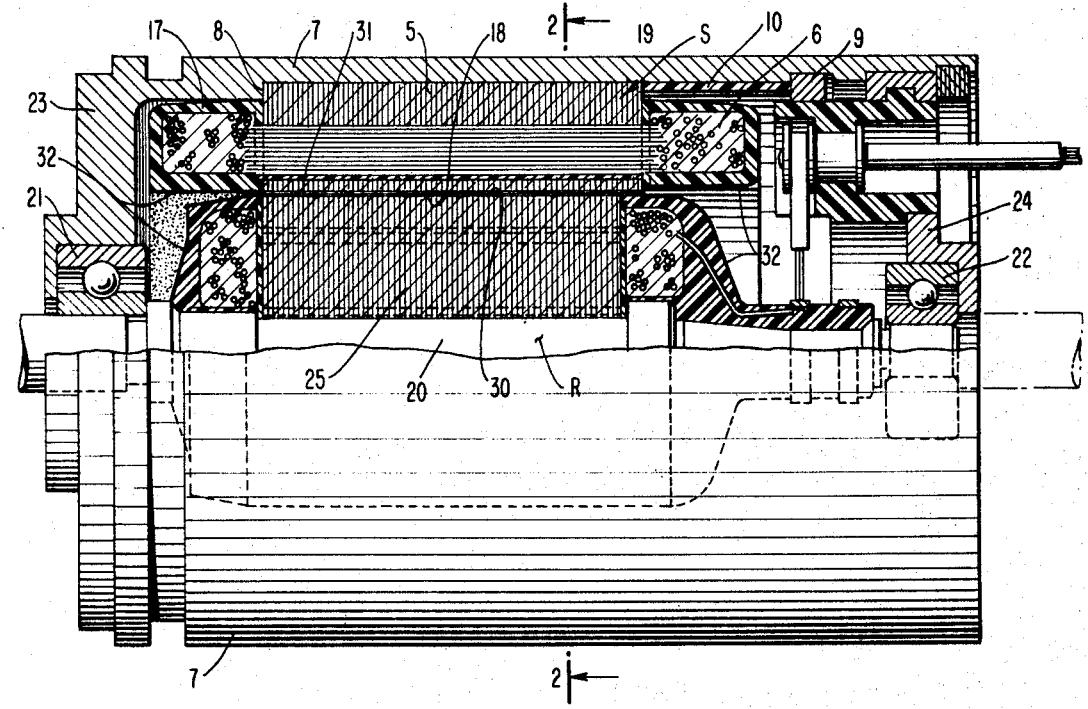
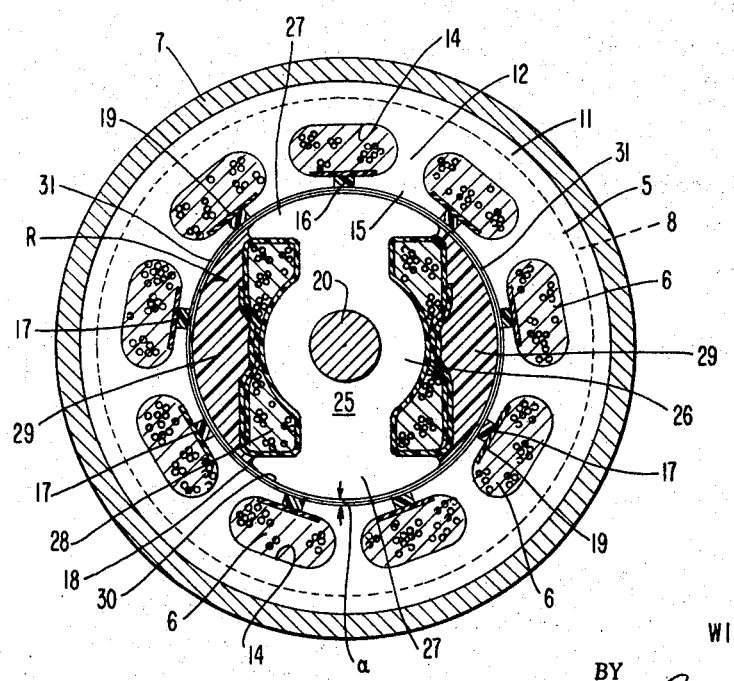
INVENTOR.
WILLIAM V. FIORE
BY *Bauer and Seymour*
ATTORNEYS

United States Patent Office 3,389,277
Patented June 18, 1968

3,389,277
DAMPED ELECTRICAL APPARATUS
William Victor Fiore, Montrose, Pa., assignor to The Bendix Corporation, a corporation of Delaware
Filed May 22, 1967, Ser. No. 640,256
10 Claims. (Cl. 310—77)

ABSTRACT OF THE DISCLOSURE

A liquid damped rotary transformer or synchro receiver comprising a rotor having a cylindrical portion positioned in a cylindrical bore of a stator, only the annular clearance space between the rotor and stator being filled with a viscous silicone or comparable damping fluid.

Specification

This invention relates to devices having relatively rotatable elements and more particularly to such devices embodying means for minimizing oscillations of the rotor and hence, the output shaft of a synchro receiver, rotary control transformer or the like.

In synchronous telemetric systems, by way of example, no fully satisfactory way has been heretofore devised for eliminating the problem of the overshooting and subsequent oscillation of the movable element or rotor in the receiving synchro unit, especially when the same is subjected to a relatively rapid adjustment or movement in response to a transmitter. It is, therefore, an object of this invention to provide a device of the above character which is novelly constructed to materially improve control of the movements of the rotor relative to the stator.

Another object is to provide a novel combination of a rotor element, a stator element and means for damping oscillation of one said element relative to the other.

Still another object is to provide a device of the above character wherein movements of the rotor are damped in a novel manner.

A further object is to provide novel means for damping oscillations of the rotor relative to a stator element inductively coupled thereto.

A still further object is to provide novel means for damping a rotor which does not adversely affect the normal functioning thereof.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a side elevation view, partly in section, of one form of synchro unit embodying the invention; and FIG. 2 is a transverse sectional view of said unit, the section being taken on line 2—2 of FIG. 1.

The invention is shown, by way of example, in the accompanying drawings as embodied in a rotary transformer or synchro receiver. As illustrated, a stator assembly S comprising an annular laminated core 5 and a winding 6 of known type, such as a distributed 3-phase, Y connected winding is mounted in a cylindrical casing 7. Said assembly is positioned in the casing by a shoulder 8 at one end of core 5 and a split ring 9 and spacer sleeve 10 at the other end. The laminated core 5 comprises an outer annular ring portion 11 and a plurality of radially inwardly extending poles 12 forming axially extending passages 14 for receiving winding 6. The poles 12 terminate at the inner ends thereof in circumferentially enlarged poleshoes 15 and form narrow slots 16 that communicate with passages 14. The stator assembly is impregnated and the end turns of winding 6 are encased with a suitably electrically nonconductive, non-magnetic compound 17, such as an epoxy resin filled with aluminum oxide. The compound is molded into place and fills slots 16 so as to form a relatively smooth and continuous cylindrical surface 18 within the stator assembly between the ends of core 5. The inner ends of slots 16 may be bridged by a sheet 19 of insulating material for retaining the turns of winding 6 in passages 14.

A rotor assembly R comprises a central shaft 20 rotatably supported in ball bearings 21 and 22 mounted in the end walls 23 and 24 of casing 7. The axes of shaft 20 and bore surface 18 are coincident.

A laminating pole piece 25 is mounted on shaft 20 for rotation therewith and has a hub portion 26 and two diametrically disposed poles 27, the outer arcuate faces of which have a radius only slightly less than the radius of bore 18. A coil 28 is wound on pole piece 25 and encapsulated in an insulating compound 29 in such manner that the coil, pole piece and compound form a cylindrical portion having a diameter equal to the maximum diameter of the pole piece 25. The annular clearance space $a$ between the surface of the cylindrical portion of the rotor and the surface of bore 18 has a relatively uniform radial width of the order of a few thousandths of an inch, the precise dimension depending somewhat upon the diameter of the rotor. For example, in one successful device having a maximum rotor diameter of about 0.573 inch, the clearance space was of the order of .003 to .0035 inch.

In synchro units of the type disclosed, particularly when the same are used as receivers or repeaters in a synchronous telemetering system, it is desirable and often essential in the interest of accuracy that means be provided for damping the movements of the rotor to reduce or eliminate overshooting and to thus eliminate or reduce undesired oscillations of the rotor. The novel means for and method of providing such damping as contemplated by this invention consists in filling the annular clearance space $a$ between surfaces 18 and 30 with a silicone or comparable liquid 31 which is capable of wetting said surfaces and has a sufficiently high viscosity and surface tension at operating temperatures to remain in the space and provide the required damping action. It has been found that a silicone fluid having a viscosity of the order of a few thousand centistokes, for example, 2,000 to 5,000, provides excellent results throughout a wide range of temperatures in a synchro of the exemplary size mentioned in the preceding paragraph. In one successful embodiment, a mixture comprising two parts of silicone fluid having a viscosity of 1,000 centistokes and one having a viscosity of 18,000 centistokes has been used. Silicone fluid has been found particularly suitable when the desired or acceptable angular speed of the rotor is comparable to or less than the flow rate of the fluid which is substantially constant at any given temperature. When the speed of the rotor is equal to or less than the flow rate of the silicone damping fluid and hence, when no appreciable damping is required or desired, the fluid offers only low resistance to such movement and hence, does not affect the efficient and effective operation of the device. When extended and more rapid movements of the rotor would otherwise occur, at speeds in excess of the flow rate of the silicone fluid, it has been found that the fluid effects substantially critical damping, a result heretofore unattainable. It is theorized that when the relative speed of the rotor and stator tends to exceed the flow rate of the silicone damping fluid, the latter offers substantial resistance which prevents the attainment of higher speeds and inertia irrespective of the force applied. When the moving force is relaxed the movement of the rotor ceases simultaneously, resulting in so-called critical damping.

The damping fluid in space $a$ has the further advantageous effect of damping or preventing sudden oscillations of small amplitude. In a synchro, for example, a 400 cycle A.C. source of excitation may create some vibrations or oscillation of the rotor, and this oscillation is aggravated by asymmetry in the structure, such as eccentricity of the rotor and stator bore. Also, in synchros and like electromagnetic devices there is a magnetostriction effect resulting in changes in the physical dimensions of laminations of the rotor and stator which causes rotary vibration. These oscillatory and vibratory effects are effectively damped by the silicone fluid between the rotor and the stator.

Only a small quantity of silicone fluid is required to substantially fill space $a$ in a small instrument. The fluid may be applied to the surfaces 18 and 30 before assembly of the rotor and stator, but it is preferable to inject a metered quantity of the liquid into space $a$ by means of a syringe or the like after assembly of the rotor and stator. It is desirable to turn the rotor slowly while the fluid is being thus injected.

Incredible as it may seem, it has been found that the silicone fluid 31 filling the air gap space $a$ will remain in the space under severe operating conditions in spite of the fact that the space remains open at each end thereof and independently of the position in which the device is mounted. It is believed that the ability of the liquid to remain in place throughout a wide range of temperatures is attributable at least in substantial part to the ability of the silicone fluid to wet the surfaces 18 and 30 contacted by it and to the surface energy thereof at the open ends of the air gap space. To further insure retention of the liquid 31 in space $a$, the surfaces of stator S and rotor R adjacent the ends of the space and forming a continuation of the surfaces 18 and 30 along which the silicone might creep may be covered by thin barrier films or coatings 32 which have a critical surface tension of wetting that is greater than the surface tension of wetting of the damping fluid 31. Low-surface energy fluorochemicals, such as fluoroinated polymers 2-(N-propylperfluorooctane sulfamido)ethyl acrylate and 1H, 1H-pentadecafluorooctyl methacrylate, having critical surface tensions of wetting of 11.1 and 10.6 dynes/cm., respectively, have been found satisfactory for the purpose.

For the purpose of carrying out the invention, silicone fluid has proved very successful in small size synchros for the reasons among others discussed above that the same has a slow evaporation rate, a relatively constant flow rate and a relatively constant viscosity throughout a wide range of temperatures. Additionally, this fluid is relatively chemically inert and does not react with the encapsulating compounds, metals and other materials.

Although only one embodiment of the invention has been illustrated in the drawing and described in the foregoing specification, it is to be expressly understood that the invention is not limited thereto. Various changes and modifications may be made without departing from the spirit and scope of the invention as will now be apparent to those skilled in the art.

What is claimed is:

1. An electromotive device, a stator element having a substantially cylindrical bore, a rotor element angularly movable relative to and inductively coupled to said stator element and having a cylindrical portion in and concentric with said bore, the diameter of said bore being slightly greater than the diameter of said cylindrical portion to thereby form an annular clearance space between the adjacent cylindrical surfaces of said bore and rotor element, and a viscous liquid filling only said clearance space, the annular ends of the latter being open to the surrounding atmosphere.

2. A device as defined in claim 1 wherein said liquid is a silicone fluid.

3. A device as defined in claim 2 wherein said liquid is capable of wetting said surfaces and is retained in said clearance space by surface tension.

4. A device as defined in claim 2 wherein the liquid has a viscosity of the order of 2,000 to 5,000 centistokes.

5. An electromotive device comprising a stator having a substantially cylindrical bore with a generally smooth wall surface, a rotor in said bore having a substantially cylindrical generally smooth peripheral surface in face-to-face relation with said bore wall surface, said surfaces being substantially concentric with an annular clearance space of substantially uniform radial thickness therebetween, and a viscous liquid filling said clearance space for damping the movements of the rotor relative to the stator, the annular ends of said clearance space being open to the surrounding atmosphere.

6. A device as defined in claim 5 wherein said liquid is a viscous silicone fluid.

7. A device as defined in claim 6 wherein the silicone fluid has a flow rate commensurate with the desired angular speed of the rotor.

8. A device as defined in claim 5 comprising a coating on the surfaces of the stator and rotor adjacent said clearance space, which coating is not readily wetted by said liquid.

9. An electromotive device comprising a hollow casing, a stator assembly in said casing comprising a stack of annular laminations having inwardly-extending, circumferentially-spaced poles with inner arcuate faces, windings on and partially filling the spaces between said poles and insulation filling said spaces adjacent the inner periphery of said stack to form with said inner arcuate faces of said poles a smooth cylindrical bore surface in said assembly, a rotor rotatably mounted in said casing and extending through said stator assembly, a portion of said rotor within said assembly comprising a stack of laminations forming circumferentially-spaced poles with outer arcuate faces, a winding on said rotor stack and insulation in the spaces between said rotor poles to form with the outer arcuate faces thereof a smooth cylindrical surface concentric with and closely adjacent said cylindrical bore surface, the radial thickness of the annular clearance space between said cylindrical surfaces being of the order of a few thousandths of an inch, and a liquid filling said clearance space, the latter being open at its ends to atmosphere within the casing and said liquid being such that the same is retained in said clearance space by surface tension under normal operating conditions.

10. A device as defined in claim 9 wherein said liquid is a silicone fluid capable of wetting said cylindrical surfaces.

References Cited

UNITED STATES PATENTS

| | | | |
|---|---|---|---|
| 2,780,745 | 2/1957 | Priftis | 336—120 |
| 3,060,335 | 10/1962 | Greenwald | 310—54 |
| 3,189,856 | 6/1965 | Leonard | 336—120 |
| 3,192,861 | 7/1965 | Haegh | 310—52 |
| 3,196,963 | 7/1965 | Klass | 177—1 |
| 3,213,797 | 10/1965 | McMahan | 310—52 |
| 3,248,582 | 4/1966 | Brown | 310—71 |
| 3,239,701 | 3/1966 | Campbell | 310—68 |
| 3,295,083 | 12/1966 | Fiore | 310—71 |

MILTON O. HIRSHFIELD, *Primary Examiner.*

J. D. MILLER, *Examiner.*